United States Patent [19]

Newkirk et al.

[11] 4,375,979

[45] Mar. 8, 1983

[54] GLASS FORMING APPARATUS

[75] Inventors: Mark C. Newkirk; Albert J. Tamagni, both of Vineland, N.J.

[73] Assignee: Maul Technology Corporation, Millville, N.J.

[21] Appl. No.: 322,800

[22] Filed: Nov. 19, 1981

[51] Int. Cl.³ .............................................. C03B 9/00
[52] U.S. Cl. ........................................ 65/360; 65/361
[58] Field of Search ................................... 65/360, 361

[56] References Cited

U.S. PATENT DOCUMENTS 2,748,536  6/1956  Allen .................................. 65/360
3,460,931  8/1969  Rowe ................................ 65/361 X
3,591,358  7/1971  Maul et al. ........................ 65/360
4,283,218  8/1981  Staley .............................. 65/360

Primary Examiner—Robert L. Lindsay, Jr.
Attorney, Agent, or Firm—Seidel, Gonda, Goldhammer & Panitch

[57] ABSTRACT

First and second arms for holding a blank mold are pivotable about a shaft between an open position and a closed position by means of a motor. A motor operated cam cooperates with rollers on the arms to apply a clamping force to prevent premature movement of the arms toward an open position.

12 Claims, 3 Drawing Figures

FIG. I

GLASS FORMING APPARATUS

BACKGROUND

The subject invention is directed to glass forming apparatus, and more particularly, to the blank mold station and/or blow mold station of an IS machine. The problem involved is how to apply a large clamping force of 2000 pounds or more to the mold holder arms without interfering with adjacent structure and at the same time providing for overtravel to automatically compensate for wear.

One solution to this problem is taught by U.S. Pat. No. 3,460,931. As disclosed therein, booster motors 100 and 102 are coupled to the mold holder arms to provide additional clamping force to resist forces tending to prematurely open the molds. Experience has shown that such booster motors are ineffective or severely limited in the clamping force which can be provided. Said patent is correct in its premise that the necessary clamping force should not be attained through enlargement of the motor means for opening and closing the mold holder arms. It is old in the art to apply the mold opening force and the mold closing force to an extension of the mold holder arms as shown in FIG. 5 of U.S. Pat. No. 3,591,358. The lastmentioned patent does not teach how to apply a clamping force separate and apart from the force which is utilized to open and close the mold holder arms.

The present invention is directed to a solution of this problem in a manner which is simple, inexpensive and reliable.

SUMMARY OF THE INVENTION

The glass forming apparatus of the present invention includes first and second arms for holding one or more blank molds. The arms are pivotable about a vertical shaft between a closed position and an opened position. A motor means is connected to the arms for pivoting the arms between said positions in timed relationship with other glass forming operations. A means is provided for applying a clamping force to prevent premature movement of the arms toward an open position.

The preferred means for applying a clamping force includes an extension on each arm projecting beyond the shaft. Each extension has at least one roller thereon. A cam is movable toward and away from an operative position wherein the cam is between and contacts the rollers. A motor means is connected to the cam for moving the cam in timed relationship with movement of the arms. The cam in its operative position contacts the rollers and spreads the extensions for applying a clamping force to the arms.

It is an object of the present invention to provide a simple, inexpensive and reliable means for applying a large clamping force to mold holder arms without interfering with adjacent structure while providing for overtravel.

Other objects and advantages will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
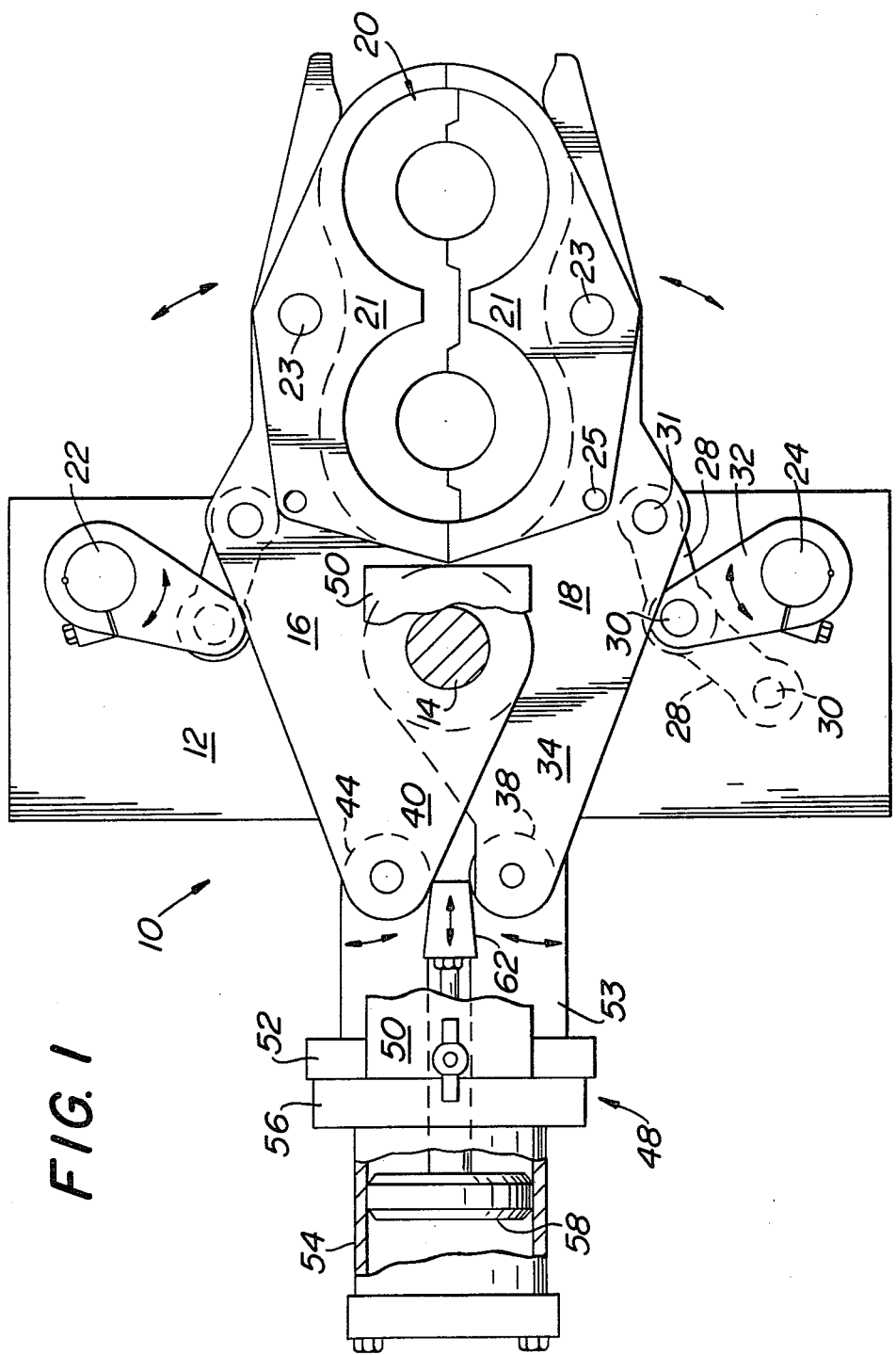
FIG. 1 is a top plan view of the mold holder arms and a glass forming machine.

Referring to the drawings in detail, wherein like numerals indicate like elements, there is shown in FIG. 1 glass forming apparatus in accordance with the present invention designated generally as 10. On top of a IS glass forming machine head 12, there is provided an upright pivot shaft 14. Mold holder arms 16 and 18 are each provided with hubs mounted on shaft 14. The arms 16, 18 may support one or more blank molds. As illustrated, the arms 16, 18 support a pair of split blank molds 20. Each mold half is supported by a top mold holder insert 21 and a bottom mold holder insert 21'. Each mold holder insert is attached to its associated arm by a bolt 23 and a float pin 25.

Figure 2:
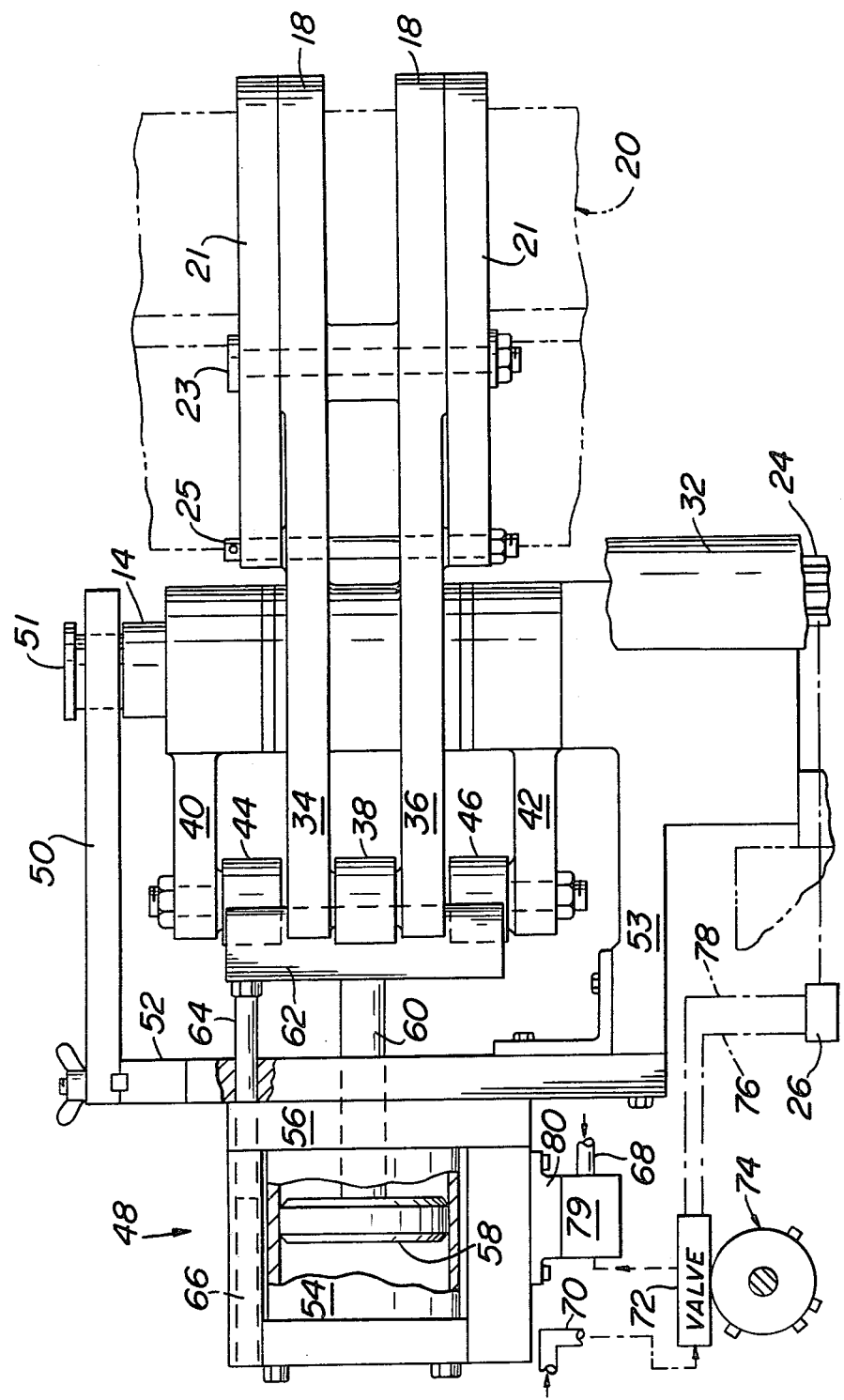
FIG. 2 is a side elevation view of the mold holder arms.

Movement of the arms 16, 18 between open and closed positions is identical. Hence, only the structure associated with arm 18 will be described in detail. A motor 26, see FIG. 2, is coupled to a splined shaft 22 for moving the arm 16 and is coupled to a splined shaft 24 for moving the arm 18. Motor 26 may be coupled to each of the splined shafts or a separate motor may be provided for each splined shaft.

Splined shaft 24 is fixed to a lever arm 32. The free end of lever arm 32 is pivotably connected to one end of link 28 by a pivot pin 30. The other end of link 28 is pivotably connected to the arm 18 by pivot pin 31. In FIG. 1, link 28 is shown in solid lines when the arm 18 is in a closed position. In FIG. 1, link 28 is shown in phantom lines when arm 18 is in an open position. The arms 16 and 18 are open and closed in unison by pivoting about the longitudinal axis of shaft 14.

Referring to FIG. 2, it will be noted that arm 18 is bifurcated at its ends. To the left of the hub on arm 18, the arm extension portions are identified as 34 and 36. Portions 34 and 36 rotatably support a roller or cam follower 38 therebetween.

To the left of the hub on arm 16, there is provided arm extension portions 40 and 42 which are spaced sufficiently apart so that arm extension portions 34, 36 may pass therebetween when the arms 16, 18 are in their open position. Extension portion 40 rotatably supports on its lower surface a roller or cam follower 44. Extension portion 42 rotatably supports on its upper surface a roller or cam follower 46. Roller 38 is equidistant from the elevations of the rollers 44, 46.

A means 48 is provided for applying a clamping force to the arms 16 and 18. Means 48 is independent of the motor 26 which opens and closes the mold holder arms 16, 18. Means 48 includes a horizontal plate 50 attached to the upper end of shaft 14 by way of bushing 51. See FIG. 2. One end of plate 50 is bolted to a vertically disposed mounting plate 52 at the upper end thereof. The lower end of plate 52 is bolted to an extension 53 on the machine head 12.

Figure 3:
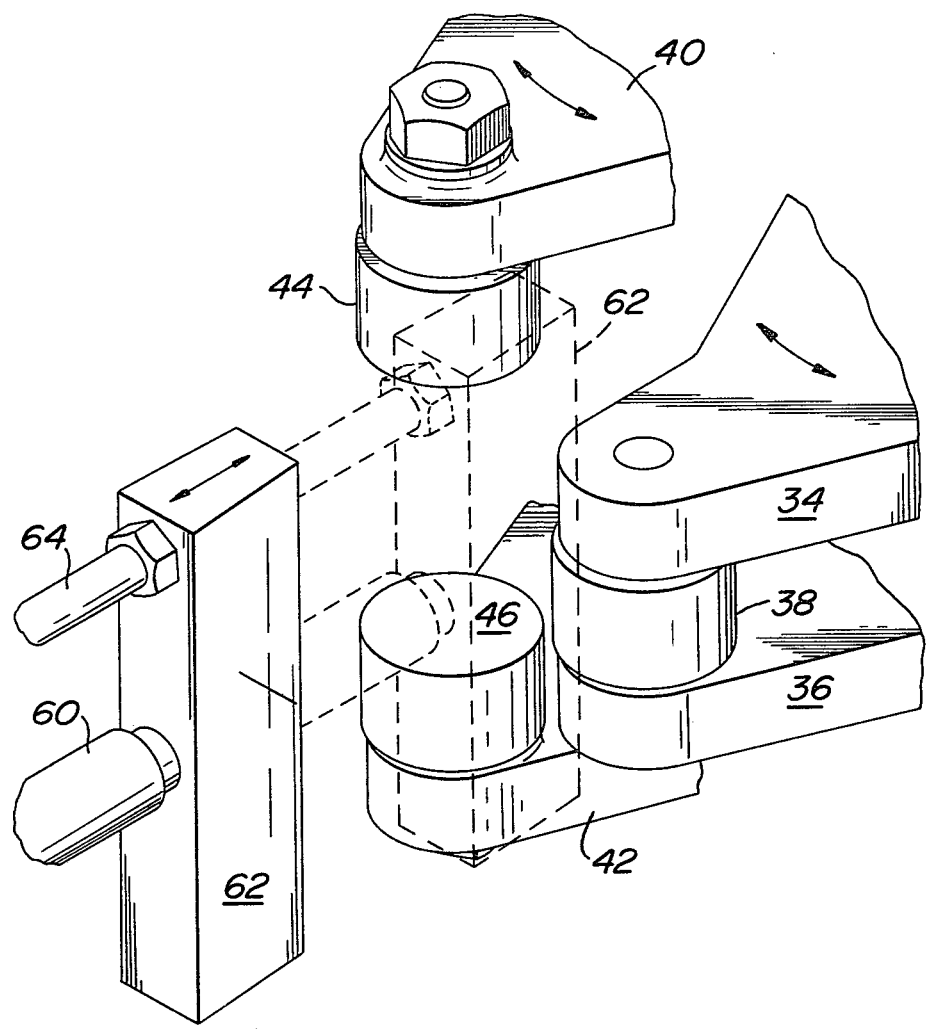
FIG. 3 is a perspective view of the cam and its relationship with the rollers on the mold holder arms.

Means 48 includes a pneumatic cylinder 54 having its head plate 56 bolted or otherwise secured to the mounting plate 52. A piston 58 within cylinder 54 is connected to one end of piston rod 60. Piston rod 60 extends through aligned holes in the plates 56, 52 and terminates at a cam 62. Cam 62 is preferably in the form of a wedge as shown more clearly in FIG. 3. The cam 62 has a slight taper on its side face. A typical taper is 3°. The height of the cam 62 corresponds to the accumulated height of the rollers 38, 44, 46 as shown more clearly in FIG. 2. A typical height for cam 62 is 6½ inches when each of the rollers 38, 44, 46 have an axial length of 1¼ inches. The axes of piston rod 60 and shaft 14 are preferably arranged to define a vertical plane.

The cylinder 54 includes at least one longitudinally extending bore 66. See FIG. 2. A guide rod 64 is telescoped into the bore 66 and is attached to the cam 62. The rod 64 extends through aligned holes in the plates 52, 56 and prevent the cam 62 from pivoting about the axis of the cylinder 54. Thus, the cam 62 has an operative position wherein it is disposed between the rollers as shown more clearly in FIG. 1 and in phantom in FIG. 3. Cam 62 has an inoperative or retracted position as shown in solid lines in FIG. 3.

The mounting plate 80 of a pilot operated 4-way valve 79 is bolted or otherwise coupled to cylinder 54. The valve member in valve 79 is shifted by pilot air from conduit 70 which first directs the pilot air through valve block 72. The pilot air directed to the valve member is opposed by a spring bias. Supply air for valve 79 is provided by conduit 68. Valve 79 alternately supplies air and vents cylinder 54 on opposite sides of piston 58 in timed relation with movement of the arms 16, 18. Correlation is attained by valve block 72 which controls flow of pilot air in conduit 70 and conduits 76, 78 which supply air to pneumatic motor 26.

The provision of a cam 62 which cooperates with rollers 38, 44 and 46 inherently provides for overtravel whereby no maintainance is required. Thus, as the cam or the rollers were, there is an automatic compensation for such wear because the cam 62 will merely have a longer stroke. Due to the fact that the means 48 for applying a clamping force cooperates with extensions of the arms 16, 18, the means 48 may be located so that it does not interfere with any other components associated with a glass forming machine.

When cam 62 is driven to its operative position by a force of about 400 pounds, it can apply a force of 3600 pounds to each of the arms 16, 18 in a direction tending to hold the arms in their closed position. The actual clamping force at the center of the mold holder arms 16, 18, namely adjacent the pins 23, may be less than 3600 pounds if the center of the arms is further away from the axis of shaft 14 as compared with the distance from shaft 14 and the rollers 38, 44 and 46 as illustrated. Since the motor 26 need only open and close the mold holder arms, it may be a smaller motor than utilized heretofore and the splined shafts 22, 24 need not have a high modulus of torsion as required heretofore.

The present invention may be embodied in other specific forms without departing from the spirit or essential attributes thereof and, accordingly, reference should be made to the appended claims, rather than to the foregoing specification, as indicating the scope of the invention.

We claim:

1. Glass forming apparatus comprising first and second arms for holding a mold, said arms being pivotable about a pivot shaft between a closed position and an open position, first motor means connected to the arms for pivoting the arms between an open and closed position, means independent of said first motor means for applying a clamping force to prevent movement by the arms toward an open position, said means for applying a clamping force including an extension on each arm projecting beyond the pivot shaft and a second motor means for moving the extensions away from each other in timed relationship with movement of the arms to thereby apply a clamping force to the mold holder arms when the arms are in their closed position.

2. Apparatus in accordance with claim 1 wherein said second motor means includes a cam movable toward and away from an operative position wherein the cam is between at least one roller on each arm extension, a fluid motor connected to said cam for moving the cam, said cam in its operative position contacting the rollers and spreading the extensions away from each other.

3. Apparatus in accordance with claim 2 wherein one of said arm extensions has a pair of rollers for cooperation with said cam, said one arm having a pair of extensions which are spaced sufficiently apart so that the extension and roller on the other arm may pass therebetween.

4. Apparatus in accordance with claim 3 including means for guiding said cam for horizontal reciprocation without permitting the cam to pivot or oscillate.

5. Glass forming apparatus comprising first and second arms pivotable about a vertically disposed pivot shaft, each arm having a mold holder insert on one side of said shaft, first motor means connected to said arms for pivoting the arms between an open and closed position, means for applying a clamping force to prevent movement of the arms toward an open position in timed relationship with said first motor means, said means for applying a clamping force including an extension on each arm and projecting away from said mold holder inserts so as to be on the other side of the pivot shaft, each extension having at least one roller supported for rotation about a vertical axis, a cam movable horizontally toward and away from an operative position wherein the cam is between said rollers, a second motor means, said second motor means being connected to said cam for moving the cam in timed relationship with movement of the arms, said cam in its operative position contacting the rollers and spreading the arm extensions for applying a clamping force to said arms adjacent said mold holder inserts when the arms are in their closed position.

6. Apparatus in accordance with claim 5 wherein said cam has a slight taper on opposite faces of about 3°.

7. Apparatus in accordance with claim 5 wherein one arm has a pair of extensions disposed one above the other with each extension supporting a roller adapted for contact with said cam.

8. Glass forming apparatus comprising first and second mold holding arms, said arms being pivotable about a pivot axis between a closed position and an open position, first motor means connected to the arms for simultaneously pivoting the arms between an open and closed position, means independent of said first motor means for applying a clamping force to prevent movement of the arms from a closed position toward an open position, said means for applying a clamping force including an extension on each arm projecting beyond the pivot shaft and a second motor means for moving the extensions away from each other in timed relationship with movement of the arms to thereby apply a clamping force to the mold holder arms when the arms are in the closed position, at least one roller on each extension, said second motor means including a cam movable in a direction generally perpendicular to the axis of said rollers toward and away from an operative position wherein the cam is between and in contact with said rollers, said cam in its operative position contacting the rollers and spreading the extensions away from each other, said cam being movable by said second motor means to an inoperative position wherein said first motor means can move said arms from a closed position toward an open position.

9. Apparatus in accordance with claim 8 wherein one of said extensions has a pair of said rollers disposed one above the other and spaced sufficiently apart so that the extension and roller on the other arm may pass there between.

10. Apparatus in accordance with claim 8 including means for guiding said cam for horizontal reciprocation without permitting the cam to pivot or oscillate, said cam having converging side faces adapted to contact said rollers.

11. Apparatus in accordance with claim 5 wherein said first motor means is connected to said arms by a pair of vertically disposed shafts on opposite sides of said pivot shaft, each of said vertically disposed shafts being connected by a link to one of said arms.

12. Apparatus in accordance with claim 8 wherein said second motor means applies a clamping force at the center of each mold holder arms of at least 2,000 pounds.

* * * * *